Patented Dec. 11, 1923.

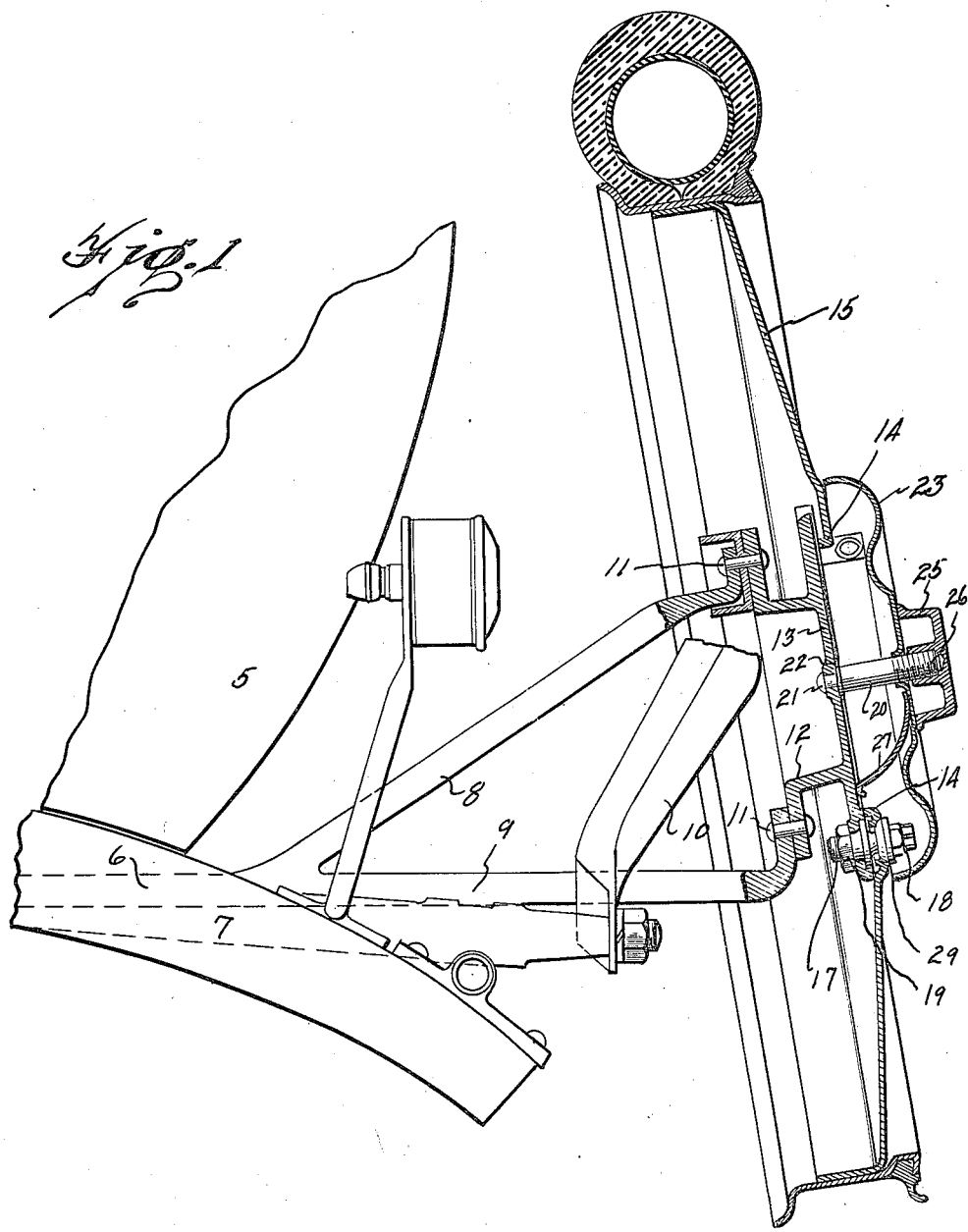

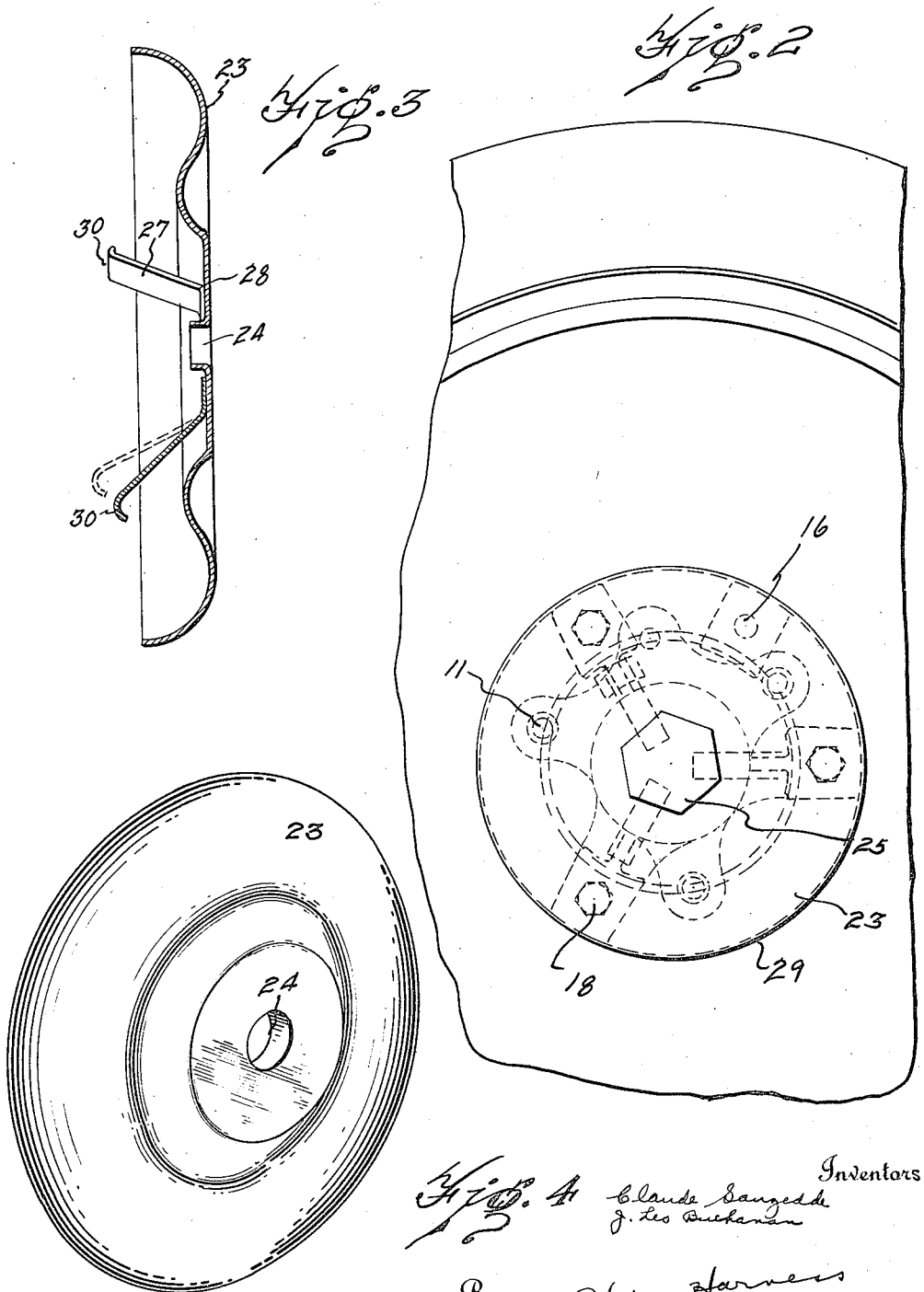

1,477,287

UNITED STATES PATENT OFFICE.

CLAUDE SAUZEDDE, OF MOUNT CLEMENS, AND JAMES LEO BUCHANAN, OF DETROIT, MICHIGAN.

SPARE-WHEEL MOUNTING.

Application filed June 10, 1922. Serial No. 567,378.

*To all whom it may concern:*

Be it known that we, CLAUDE SAUZEDDE and JAMES LEO BUCHANAN, of the city of Mount Clemens, county of Macomb, and State of Michigan, and the city of Detroit, county of Wayne, and State of Michigan, and citizens of the Republic of France and the United States, respectively, have invented certain new and useful Improvements in Spare-Wheel Mountings, of which the following is a specification, reference being had to the accompanying drawings.

Our invention relates to mountings for spare wheels of an automobile and more particularly for disc wheels.

It is the custom when using disc wheels on automobiles which are demountable at the hub to provide a bracket or some fastening means on the rear of the vehicle to which the disc wheel is bolted through the use of the bolts by which the wheel had been attached to the hub of the vehicle. When this is done, the appearance of the vehicle from the rear is substantially damaged because of the rough appearance of the spare wheel and the mounting plate to which it is attached.

It is therefore one of the objects of our invention to provide an efficient and suitable mounting for a disc wheel wherein the wheel is held securely in place and the unsightly appearance of the wheel as it is ordinarily attached to its supporting member will be done away with.

With these and other objects in view, our invention consists in the arrangement, combination and construction of the various parts of our improved device as described in the specification, claimed in our claims and shown in the accompanying drawings, in which:

Fig. 1 is a central sectional view of our improved mounting shown attached to an automobile.

Fig. 2 is an end elevation thereof with certain parts shown in dotted lines.

Fig. 3 is a sectional view of the cover plate disposed over the center portion of the wheel.

Fig. 4 is a perspective view of the same.

We have shown the rear end of an automobile body 5 to which supporting members 6 and 7 may be suitably secured. We have shown arms 8 and 9 leading from the supporting member 6 and an arm 10 leading from the supporting member 7, each of which arms are attached at their outer ends, as by rivets 11, to a member 12.

The member 12 is provided with an annular plate like face 13 against which the inner periphery 14 of a disc wheel 15 is adapted to bear. Apertures are provided around the face of the plate 13 adapted to register with the apertures 16 of the disc wheel 15 and the disc wheel is adapted to be attached to the plate 13 through said apertures by means of the bolts 17, having the usual heads 18 thereon and being provided with screw threaded ends adapted to be screwed into the nuts 19.

The plate 13 is provided with an aperture at approximately the center thereof through which the end of a bolt 20 is adapted to pass and to be secured against outward movement by the head 21 thereon. It is sometimes desirable to affix the bolts 20 permanently to the plate 13, in which case the said bolt 20 may be offset so as to form a shoulder 22 adapted to bear against the face of the plate 13 which shoulder, together with the head 21, will secure the bolt 20 rigidly to the plate 13.

We then provide a member 23 suitably curved in contour to present a pleasing appearance and having an aperture 24 at approximately its center adapted to register with the bolt 20. We then provide a nut 25, preferably similar in appearance to the hub cap of the vehicle, adapted to be screwed on the screw threaded end 26 of the bolt 20. The member 23 is provided with a series of spring members 27 suitably secured thereto as at 28 and adapted to bear against the plate 13 so that the nut 25 may be screwed down until the rounded ends 30 of the spring members 27 are contracted and then the member 23 will be securely positioned with its edges 29 bearing against the disc wheel 15 on the outer side of the securing nuts 18, thus securing the wheel in place and at the same time covering the unsightly appearance of the plate 13 and the bolt heads 18.

It will thus be seen that we have provided a simple and complete mounting for a spare wheel together with means for beautifying the appearance thereof rearward of the vehicle.

It is obvious that various changes may be made in the arrangement, combination and construction of the various parts of our improved device without departing from the spirit of our invention and it is our intention to cover by our claims such changes as may be reasonably included within the scope thereof.

What we claim is:

1. A spare wheel cover plate consisting of a cap adapted to hide from view the means whereby such a wheel is attached to an automobile and spring members on the inner side of said cap adapted to bear against the face of the wheel, when said cap is disposed adjacent the said wheel.

2. A spare wheel cover plate, consisting of a cap having an aperture therein adapted to register with a supporting member, and spring members on its inner side adapted to bear against the face of the wheel when said cap is disposed adjacent said wheel.

3. A device of the class described, comprising a supporting device, a disc wheel secured thereto near its hub, a support protruding through the center of said wheel and a cap member secured thereto adapted to hide said securing means from view, said cap having resilient members adapted to bear against the face of said wheel when said cap is disposed adjacent thereto.

4. A device of the class described, comprising arms supported on a vehicle and secured at their outer ends to a plate like member, a wheel bolted near its hub to said plate like member, a member secured near the center of said plate like member, and a cap member secured thereto adapted to hide said bolts from view, said cap having resilient members adapted to bear against the face of said wheel when said cap is disposed adjacent thereto.

CLAUDE SAUZEDDE.
J. LEO BUCHANAN.